United States Patent [19]
Teranishi et al.

[11] 3,975,270
[45] Aug. 17, 1976

[54] PROCESS FOR RECOVERING USABLE OLIVE-PROCESSING LIQUOR FROM OLIVE-PROCESSING WASTE SOLUTION

[75] Inventors: Roy Teranishi, Kensington; Donald J. Stern, Berkeley, both of Calif.

[73] Assignee: The United States of America as represented by the Secretary of Agriculture, Washington, D.C.

[22] Filed: Dec. 3, 1975

[21] Appl. No.: 637,250

[52] U.S. Cl. ................................ 210/53; 71/25; 210/290; 423/183; 426/442; 426/615
[51] Int. Cl.$^2$ ................................ C02B 1/20
[58] Field of Search ............... 426/442, 615, 638; 423/183, 641; 210/28, 52, 53, 290, 73 R; 71/25

[56] References Cited
UNITED STATES PATENTS

| | | | |
|---|---|---|---|
| 1,535,709 | 4/1925 | Booth | 210/52 |
| 1,928,229 | 9/1933 | Preble | 426/615 X |
| 1,966,733 | 7/1934 | Reimers | 210/52 |
| 2,464,947 | 3/1949 | Sammis et al. | 426/615 X |
| 3,002,839 | 10/1961 | Levinson et al. | 426/615 X |
| 3,085,881 | 4/1963 | Ball | 426/615 X |
| 3,235,492 | 2/1966 | Andresen et al. | 210/52 |
| 3,577,341 | 5/1971 | Keith et al. | 210/53 |
| 3,732,911 | 5/1973 | Lowe et al. | 426/615 X |
| 3,876,546 | 4/1975 | Hsiung et al. | 210/290 X |

FOREIGN PATENTS OR APPLICATIONS

| | | | |
|---|---|---|---|
| 324,214 | 2/1971 | U.S.S.R. | 210/52 |

OTHER PUBLICATIONS
"Reconditioning Food Processing Brines With Activated Carbon", Mercer et al., Chem. Eng. Progr. Symp., Ser. 67, (107), pp. 435–438, 1971.

*Primary Examiner*—S. Leon Bashore
*Assistant Examiner*—Arthur L. Corbin
*Attorney, Agent, or Firm*—M. Howard Silverstein

[57] ABSTRACT

Useful olive-processing liquor is recovered from olive-processing waste solution by a process wherein lime, charcoal, and calcium carbonate are successively added to the olive-processing waste solution to form a mixture and the mixture is allowed to settle. The treated liquor is separated from the settled contaminants and is then immediately recyclable to process fresh olives.

8 Claims, No Drawings

PROCESS FOR RECOVERING USABLE OLIVE-PROCESSING LIQUOR FROM OLIVE-PROCESSING WASTE SOLUTION

DESCRIPTION OF THE INVENTION

The invention relates to and has among its objects the provision of a novel process for removing contaminants from olive-processing waste and for recovering useful olive-processing liquor therefrom. Further objects of the invention will be evident from the following description wherein parts and percentages are by weight unless otherwise specified.

Ripe olives in their natural (or fresh) state are extremely bitter and thus must be processed for human consumption. To remove the bitter principle olives are soaked in aqueous sodium hydroxide (lye) for extended periods of time. After soaking, the olives are removed from the lye bath, washed with water, neutralized with acetic acid, and then soaked in aqueous sodium chloride (brine) for flavoring.

The lye (or alkaline) solution employed in the initial soaking of the fresh olives becomes contaminated with organic impurities. These impurities impart a deep brown, almost black, color and an extremely unpleasant odor to the lye solution. Because the biological oxygen demand (BOD) of this waste is extremely high, it cannot be released into municipal sewage treatment systems without first being diluted with enormous quantities of water. Currently, disposal of the olive-processing fluid is accomplished by forming "ponds" into which the liquid is placed. The water is allowed to evaporate from these ponds, leaving a sludge of lye and the organic contaminants. Because of its unpleasant aroma the used fluid must be piped or trucked many miles to uninhabited areas where pollution consequences hopefully are minimized. The lye, of course, poisons the soil in and around the "ponds." This disposal operation involves considerable expense both for handling the waste and for land needed to house the "ponds." Also, the cost of lye has recently increased tremendously. Olive processors fear that expenses will become prohibitive and that they will be forced to discontinue part of their operations.

The invention described herein provides a means for obviating the problems outlined above. By applying the process of the invention the contaminants in the lye solution may be removed so that the purified liquor can be recycled.

One advantage of the invention, then, is that it is economical. In the first place, since the lye baths can be used over and over, preparation of new lye solutions is minimized. Hence, the expense for lye is greatly reduced. In an average olive-processing plant, approximately 800,000 gallons of lye solution can be used per day. Thus, the savings on lye alone can readily be seen.

Secondly, the expense of piping or trucking the olive-processing waste to ponds for disposal is also avoided. Along the same lines, large investments in land to house the disposal ponds are obviated. Both of these factors contribute to make the instant process even more economical.

It is above all to be noted that the present invention greatly reduces pollution. This is a most desirable feature from the standpoint of ecological considerations.

The following is a detailed description of the process of the invention. After olives are soaked in and removed from the lye solution, the liquid is directed to a tank or other suitable container wherein lime is added to the waste. Generally, about 1 part of lime is added per 900 parts of waste lye solution. The contents are stirred for a short period, for example, about 15 to 30 minutes, and then charcoal is added to the slurry. Usually, the amount of charcoal required is about 1 part per 900 parts of the waste liquid. The slurry is stirred during the addition of charcoal and stirring is continued for approximately 15–30 minutes.

At this point calcium carbonate, in a ratio of about 2.5 parts per 900 parts of lye solution, is added to the stirred slurry. Stirring is continued for about 15–30 minutes and then the slurry is pumped to another tank wherein the slurry is allowed to settle. Usually, complete settling takes place in about 30 minutes to an hour. The liquor is removed from the settled contaminants and is ready for reuse. The recovered lye solution is nearly colorless and is completely free of any unpleasant odor.

Although not necessary, it may be desired to remove all traces of color from the recovered liquor, which exhibits a pale yellow color after treatment in accordance with the above procedure. To this end the lye solution, after removal of the settled contaminants, is passed through a suitable filter. The filter may take the form of a large column filled partly with sand, partly with charcoal, and partly with a filter aid such as celite and the like in a ratio of about 2:1:2, respectively. The recovered lye solution can be passed through the column and the exiting liquid may then be recycled.

Other methods of carrying out the process of the invention will be suggested to those skilled in the art. It should be noted that the above embodiment of the invention is merely illustrative and is not meant as a limitation.

As mentioned above, the instant invention has several economic advantages. The savings realized in purchasing lye, in piping or trucking the used processing liquor, and in purchasing real estate will more than offset the expense of purchasing lime, charcoal, and calcium carbonate. Furthermore, no additional equipment is necessary; the benefits of the invention can be obtained using present processing machines and equipment with only slight modifications.

Another advantage of the invention is that pollution from the lye waste is substantially reduced. Only the settled contaminants (sludge) must be disposed of and, since the volume of waste is small, disposal is not difficult. In fact, this sludge may be used as fertilizer because it contains only organic contaminants, the lye having been removed and recycled.

Any residual calcium ions that may be carried over to the treated liquor also provide the advantage of helping to firm the olives; thus a better quality product is produced.

Another advantage of the invention is that removal of organic contaminants from the lye solution eliminates foaming or frothing of the processing liquid. As a consequence, pumping and other operations are facilitated.

The invention is further demonstrated by the following illustrative example.

EXAMPLE

An 18 l. sample of black olive processing waste lye solution (pH 11, BOD = 40,000) was vigorously stirred and 20 g. of calcium hydroxide (lime) was added. Stirring was continued for 20 minutes and then 20 g. of powdered charcoal was introduced into the stirring mixture. After 20 additional minutes of stirring 50 g. of calcium carbonate was added to the slurry, which was stirred another 20 minutes and then allowed to settle. After 1 hour the liquid was separated from the settled contaminants. The recovered liquid was clear and had a pH of 11 and a BOD of 550. The liquid exhibited a slight pale yellow color but had no detectable odor.

A 10 l. aliquot of this liquid was filtered through a column composed of 5.0 kg. sand, 2.5 kg. granular charcoal, and 5.0 kg. Celite 545. The filtrate was clear, colorless, and odorless, and had a pH of 11 and a BOD of 150. (Celite 545 is a conventional non-acid washed diatomaceous earth filter aid prepared by Fisher Scientific Co.)

Having thus described our invention, we claim:

1. A process for recovering usable olive-processing liquor from alkaline olive-processing waste solution containing contaminants, which comprises
   a. successively adding lime, charcoal, and calcium carbonate to said waste solution to form a mixture,
   b. allowing the mixture to settle to form a usable olive processing liquor and a sludge containing contaminants, and
   c. separating the usable olive-processing liquor from the sludge containing contaminants.

2. The process of claim 1 wherein the lime, charcoal, and calcium carbonate are added to said waste solution at intervals of about from 15 to 30 minutes.

3. The process of claim 1 wherein said waste solution is stirred during the addition of lime, charcoal, and calcium carbonate.

4. The process of claim 1 wherein the mixture in Step b is allowed to settle for about 30 to 60 minutes.

5. The process of claim 1 wherein the usable olive-processing liquor obtained in Step c is filtered through sand, charcoal, and a diatomaceous earth filter aid in a ratio of about 2:1:2, respectively.

6. The process of claim 1 wherein the amount of lime employed in Step a is about 1 part per 900 parts of waste solution.

7. The process of claim 1 wherein the amount of charcoal employed in Step a is about 1 part per 900 parts of waste solution.

8. The process of claim 1 wherein the amount of calcium carbonate employed in Step a is about 2.5 parts per 900 parts of waste solution.

* * * * *